United States Patent
Park et al.

(10) Patent No.: US 11,243,678 B2
(45) Date of Patent: Feb. 8, 2022

(54) METHOD OF PANNING IMAGE

(71) Applicant: PJ FACTORY CO., LTD., Seoul (KR)

(72) Inventors: Jung Hwan Park, Seoul (KR); Hee Kyung Kang, Seoul (KR); Bon Sung Koo, Gyeonggi-do (KR)

(73) Assignee: PJ FACTORY CO., LTD., Seoul (KR)

( * ) Notice: Subject to any disclaimer, the term of this patent is extended or adjusted under 35 U.S.C. 154(b) by 0 days.

(21) Appl. No.: 16/958,562

(22) PCT Filed: Dec. 28, 2018

(86) PCT No.: PCT/KR2018/016816
§ 371 (c)(1),
(2) Date: Jun. 26, 2020

(87) PCT Pub. No.: WO2019/132563
PCT Pub. Date: Jul. 4, 2019

(65) Prior Publication Data
US 2020/0341608 A1    Oct. 29, 2020

(30) Foreign Application Priority Data

Dec. 29, 2017    (KR) .......................... 10-2017-0184772

(51) Int. Cl.
*G06F 3/0485*    (2013.01)
*G06F 3/0481*    (2013.01)
*G06F 3/0484*    (2013.01)

(52) U.S. Cl.
CPC ........ *G06F 3/0485* (2013.01); *G06F 3/04817* (2013.01); *G06F 3/04842* (2013.01); *G06F 3/04845* (2013.01)

(58) Field of Classification Search
CPC ............... G06F 3/04845; G06F 3/0485; G06F 3/04817; G06F 3/04842
See application file for complete search history.

(56) References Cited

U.S. PATENT DOCUMENTS 5,611,060 A * 3/1997 Belfiore ................ G06F 3/0485
715/819
6,331,863 B1 * 12/2001 Meier ................. G06F 3/04812
345/684

(Continued)

FOREIGN PATENT DOCUMENTS

JP    09-258952 A    10/1997
KR    10-1501028 B1    3/2015

OTHER PUBLICATIONS

International Search Report for PCT/KR2018/016816 dated Apr. 11, 2019 (PCT/ISA/210).

(Continued)

*Primary Examiner* — Andrew T Chiusano
(74) *Attorney, Agent, or Firm* — Sughrue Mion, PLLC (57) ABSTRACT

Image panning method is disclosed. Embodiments provide a method performed by a device for placing a second object on a first object on screen, including moving the first object on screen, responsive to a drag moving the second object over the first object in a first direction, in a second direction opposite to the first direction, and placing the second object at end position of the drag in the first object, when the drag is terminated for the second object. The method allows a drag for moving the second object to a vicinity of an end of the first object or to an outside area of the first object beyond the end of the first object.

13 Claims, 10 Drawing Sheets

(56) References Cited

U.S. PATENT DOCUMENTS

| | | |
|---|---|---|
| 10,061,493 B2 | 8/2018 | Park et al. |
| 2002/0180812 A1 | 12/2002 | Kim et al. |
| 2007/0097150 A1* | 5/2007 | Ivashin ................. G06F 3/0485 345/660 |
| 2010/0017734 A1 | 1/2010 | Cummins et al. |
| 2010/0070912 A1* | 3/2010 | Zaman ................. G06F 3/0481 715/784 |
| 2011/0302532 A1* | 12/2011 | Missig ................. G06F 3/0488 715/823 |
| 2014/0028555 A1* | 1/2014 | Oh ........................ G06F 3/0488 345/158 |
| 2014/0258903 A1* | 9/2014 | Kanbara ............. G06F 3/04817 715/765 |
| 2014/0372923 A1* | 12/2014 | Rossi ................... G06F 3/0488 715/769 |
| 2015/0040050 A1 | 2/2015 | Nakao et al. |
| 2016/0117085 A1* | 4/2016 | Park ...................... G06F 3/0488 715/771 |
| 2018/0165007 A1* | 6/2018 | Artigue ............... G06F 3/04886 |
| 2018/0188926 A1* | 7/2018 | Park ...................... G06F 3/0482 |

OTHER PUBLICATIONS

Notice of Reasons for Refusal dated Aug. 17, 2021 from the Japanese Patent Office in JP Application No. 2020-536663.

* cited by examiner

METHOD OF PANNING IMAGE

CROSS REFERENCE TO THE RELATED APPLICATIONS

This application is a National Stage of International Application No. PCT/KR2018/016816 filed Dec. 28, 2018, claiming priority based on Korean Patent Application No. 10-2017-0184772, filed Dec. 29, 2017

BACKGROUND

1. Field

The present disclosure in some embodiments relates to an image panning method. More particularly, the present disclosure relates to a method of easily inserting an insert image into a main image when creating and editing a multi-depth image.

2. Description of the Related Art

The statements in this section merely provide background information related to the present disclosure and do not necessarily constitute prior art.

When viewing an image through an electronic device, a user may want details of the image or magnified images of specific parts of the image. For example, as for a car image, the user may want to view a more detailed image of a specific part such as a headlight, a car wheel, etc.

Portable electronic devices such as smart phones have such a small screen that makes it difficult to provide a discernible detailed image of a specific portion of the whole image. One may seek to obtain a discernible detailed image of the specific portion by zooming in the relevant image area, which provides a rough enlargement of the existing image with an increased pixel size rather than a satisfactory resolution, failing to present much anticipated additional information.

In order to solve such a deficiency, some inventors of the present disclosure are granted Korean Patent No. 10-1501028 (Registered May 31, 2014) for an invention of new format images (hereinafter, 'multi-depth image') and a method of creating the same which allows a basic image (hereinafter, 'main image') to be inserted with other images (hereinafter referred to as 'insert image') which can provide additional information.

This document discloses the definition of a multi-depth image and a user interface for creating and editing multi-depth images. The present disclosure, succeeding the aforementioned preceding invention, is directed to a method of easily inserting an insert image into a main image when creating and editing a multi-depth image.

SUMMARY

The present disclosure in some embodiments seeks to provide a method of easily inserting an insert image into a main image when creating and editing a multi-depth image.

The technical problem to be solved by the present disclosure is not limited to providing the method as mentioned above, and other unmentioned technical problems can be obviously derived by a person having ordinary skill in the art from the following description.

At least one embodiment of the present disclosure provides a method performed by an electronic device for placing a second object on a first object displayed on a screen of the electronic device. The method including moving the first object displayed on the screen, in response to a drag for moving the second object over the first object in a first direction, in a second direction opposite to the first direction, and placing the second object at an end position of the drag in the first object, when the drag is terminated for the second object. Herein, the moving of the first object in the second direction includes moving, even when the end of the first object reaches an end of the screen, the first object continuously in the second direction in accordance with the drag of the second object in the first direction, to thereby allow a drag for moving the second object to a vicinity of an end of the first object or to an outside area of the first object beyond the end of the first object.

As described above, according to at least one embodiment of the present disclosure, the main image is moved in a direction opposite to the drag direction of the insert image, for enabling the user to easily insert the insert image into the main image.

DETAILED DESCRIPTION

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, i), ii), (a), (b), etc., are used solely for the purpose of differentiating one component from the other, not to imply or suggest the substances, the order or sequence of the components. Throughout this specification, when a part "includes" or "comprises" a component, the part is meant to further include other components, not excluding thereof unless specifically stated to the contrary. The terms such as "unit," "module," and the like refer to units for processing at least one function or operation, which may be implemented by hardware, software, or a combination thereof.

1. Structure of Multi-Depth Image

Figure 1:
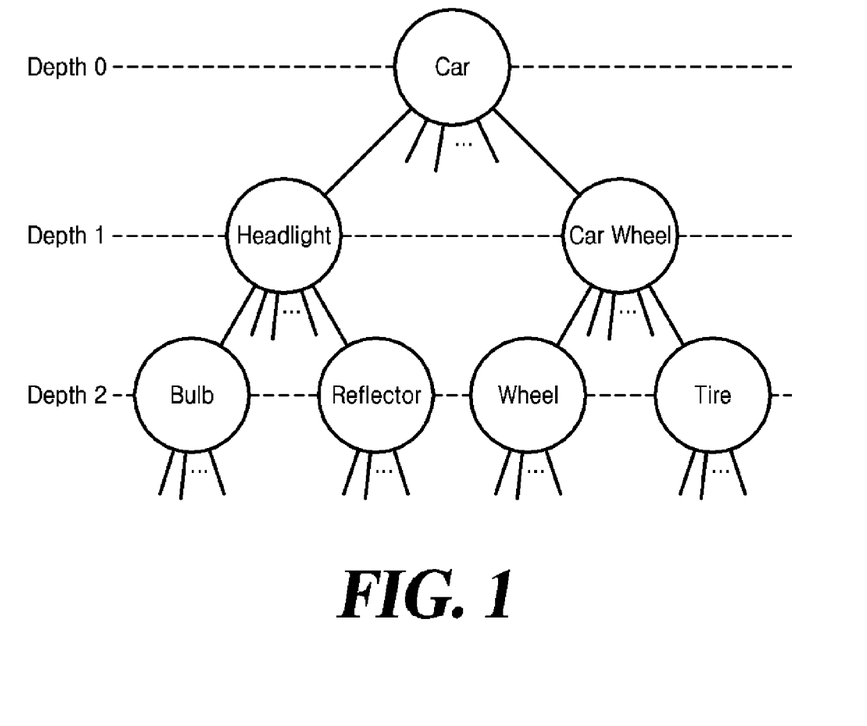
FIG. 1 is a conceptual diagram for explaining a multi-depth image.

FIG. 1 is a conceptual diagram for explaining the structure of a multi-depth image.

FIG. 1 is not an actual screen in which a multi-depth image is displayed in the image viewer, but a conceptual diagram of the image structure.

As shown in FIG. 1, a multi-depth image is a structure in which multiple images are connected in a tree structure. The topmost image of the tree structure is the main image. FIG. 1 illustrates a whole car image as the main image.

Images other than the main image are insert images. In the tree structure, the root node corresponds to the main image, and one or more insert images are linked under the main image with a parent, sibling, or child relationship to each other.

The main image has a depth of 0, and an insert image directly inserted into the main image has a depth of 1. For example, an image of a whole automobile displayed (hereinafter, referred to as 'full car image') may be inserted with an image of a headlight (hereinafter, referred to as 'headlight image') and an image of a car wheel (hereinafter referred to as 'car wheel image'), in which the headlight image and the car wheel image have a depth of 1.

Another insert image inserted into the insert image has a depth of 2 or more. For example, the headlight image having depth 1 may be inserted with an image of a bulb (hereinafter, referred to as 'bulb image') and an image of a reflector (hereinafter, 'reflector image'), wherein the bulb image and the reflector image have a depth of 2, respectively. In addition, the car wheel image having depth 1 may be inserted with an image of a wheel (hereinafter, referred to as 'wheel image') and an image of a tire (hereinafter, 'tire image'), in which the wheel image and the tire image have a depth of 2, respectively.

One may continue to insert images in this manner. For example, the bulb image, reflector image, wheel image, or tire image may be inserted with yet another image, wherein the yet another insert image has a depth of 3.

A plurality of images connected in a tree structure is stored as a single file together with properties defining connection relationship between images, to form a multi-depth image.

2. Display of Multi-Depth Image

In FIG. 1, the car node has, underneath it, a headlight node and a car wheel node. The headlight node has, underneath it, a light bulb node and a reflector node. The car wheel node has, underneath it, a wheel node and a tire node.

A multi-depth image is an image format in which an object of a child node is inserted into an object of a parent node in the tree structure illustrated in FIG. 1. An object inserted is generally an image when inserting an object of a child node into an object of a parent node. However, in addition to images, various objects may be inserted into the objects of the parent node as objects of the child node such as moving pictures, texts, voices, links to other files, Internet address links, bookmarks, and the like. Hereinafter, for convenience of explanation, an illustrative example case will be described where both the object of the parent node and the object of the child node are images.

As illustrated in the tree structure in FIG. 1, a multi-depth image is generated by inserting an image of a child node (hereinafter referred to as a 'child image') at an appropriate position in an image of a parent node (hereinafter referred to as a 'parent image'). Inserting the child image at a proper position in the parent image may be performed by using an insertion method which includes comparing the child image with the parent image, and then inserting the child image at a position where a feature of the child image has been detected in the parent image.

Figure 2:
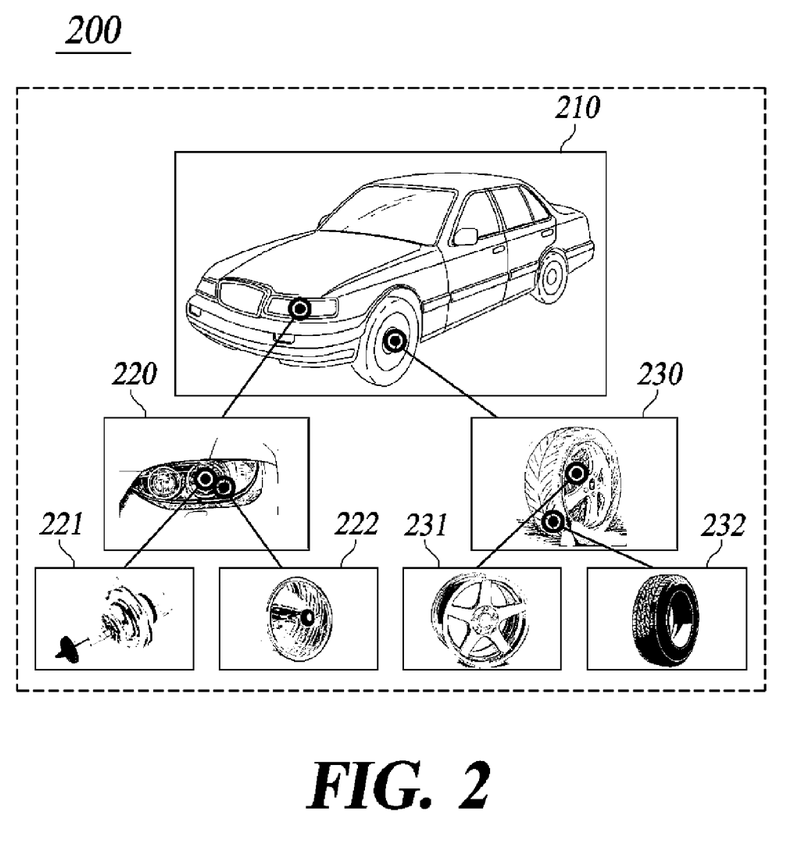
FIG. 2 is a diagram illustrating a state in which the multi-depth image of FIG. 1 is actually displayed on screen in an image viewer.

FIG. 2 is a diagram illustrating a state in which the multi-depth image of the FIG. 1 is actually displayed on screen in an image viewer.

All the images constituting the multi-depth image 200 of a car may be displayed on screen at once in the image viewer as shown in FIG. 2. Alternatively, the constituent images of the entire car image 210, light image 220, a bulb image 221, a reflector image 222, a car wheel image 230, a wheel image 231, or a tire image 232 may be displayed singly. When each image is displayed alone, its insert images may be displayed by clicking or touching an icon (⊙ shape in FIG. 2) indicating that another image has been inserted.

As shown in FIG. 2, multi-depth images may be provided as follows:
a. the full car image 210 with the headlight image 220 inserted at a position where a feature similar to the headlight image 220 has been detected,
b. the full car image 210 with the car wheel image 230 inserted at a position where a feature similar to the car wheel image 230 has been detected,
c. the headlight image 220 with the bulb image 221 inserted at a position where a feature similar to the bulb image 221 has been detected,
d. the headlight image 220 with the reflector image 222 inserted at a position where a feature similar to the reflector image 222 has been detected,
e. the car wheel image 230 with the wheel image 231 inserted at a position where a feature similar to the wheel image 231 has been detected, and
f. the car wheel image 230 with the tire image 232 inserted at a position where a feature similar to the tire image 232 has been detected.

However, it is not necessary that a parent image be inserted with a child image at a position where a feature of the child image has been detected, but the parent image may be inserted at any position therein with the child image, to structurally establish a multi-depth image.

3. Basic Interface

In the multi-depth image, the image of the root node is the 'main image', and all images except the main image are 'insert images'. A user interface for inserting an insert image into the main image might include the following steps:
① Receive a user input to select the main image.
② Receive a user input to select an insert image.
③ Display, on the screen, the main image and the insert image which is iconized in a reduced state.
④ Receive a user input to drag the iconized insert image.
⑤ Receive the end of the drag input from the user.
⑥ Insert the insert image at the end position of the touch input.

A user interface for inserting another insert image into the insert image might include the following steps:
① Receive a user input to select the main image.
② Receive a user input to select an insert image.
③ Display, on the screen, the main image and the insert image which is iconized in a reduced state.
④ Receive a user input to drag the iconized insert image.
⑤ When the iconized insert image is dragged to the position where the existing insert image has been inserted, display the existing insert image on the screen in place of the main image.
⑥ Receive another user input to drag the iconized insert image.
⑦ Receive the end of the drag input from the user.
⑧ Insert the insert image at the end position of the touch input. When the existing insert image has a depth of N, the depth of the newly inserted image is N+1.

According to the above-described user interfaces, an insert image can be inserted by one-touch or one-click into the main image when creating and editing a multi-depth image.

However, a touch interface provided by a smart phone, tablet, or the like takes an oversized finger used for smaller targets thereon, which retards inserting an insert image at a corner position of the main image. In addition, a smartphone user would have the draggable range reduced when holding the smartphone and dragging an image to be inserted by using a short finger such as a thumb.

An embodiment of the present disclosure provides a method of easily inserting an insert image into a main image when creating and editing a multi-depth image, by moving the main image in a direction opposite to a drag direction of the insert image.

When it is desired to insert a new image into the main image, the main image will be a parent image (depth 0), and the new image will be a second object (depth 1). When it is desired to insert a new image into an existing insert image with a depth N, the existing insert image will be a parent image (depth N), and the new image will be a second object (depth N+1).

Hereinafter, the object to be inserted is referred to as a 'second object', the target image to insert the second object is referred to as a 'parent image', and all or a part of the parent image as displayed on the screen is referred to as a 'first object'. The second object is typically an image. However, in addition to images, a variety of objects such as video, text, voice, links to other files, Internet address links, bookmarks, etc., can be the second object. Hereinafter, an illustrative example case will be described where the second object is an image.

4. First Embodiment

Figure 3A:
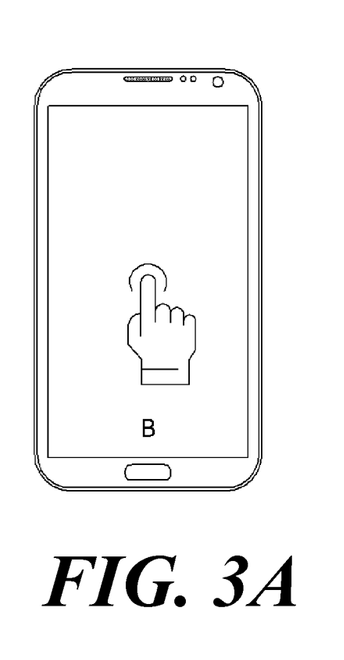
FIGS. 3A and 3B show a method according to at least one embodiment, illustrating a screen change after selection of a second object.
Figure 3B:
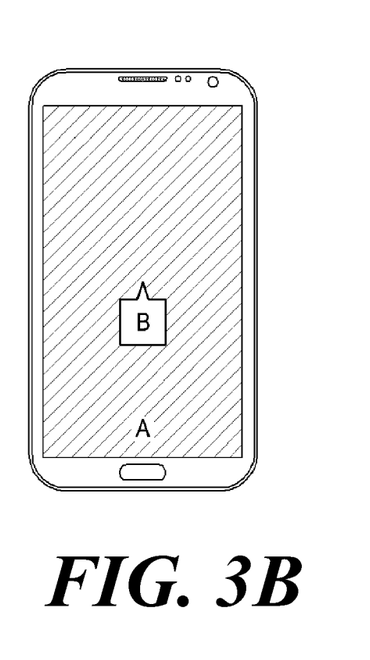

FIGS. 3A and 3B show a method according to at least one embodiment, illustrating a screen change after selection of a second object.

FIG. 3A shows a screen of an electronic device receiving a user input to select a second object to be inserted into a parent image. More specifically, FIG. 3A shows a case where a user input for selecting a second object is received at the center of the screen while the second object is displayed on the screen.

The user input for selection of the second object may be a mouse click. Alternatively, it may be to touch the touch screen. Alternatively, it may be a long press on a mouse or a touch screen.

FIG. 3B illustrates a screen change after the electronic device receives a user input to select a second object to be inserted into the parent image.

When the second object "B" is selected, the first object "A" (a screen area where the parent image is fully or partially displayed) and the second object that is iconized are displayed on the screen.

The position where the iconized second object is displayed may be the location of the user input for selection of the second object. In FIG. 3A, the user input for selecting the second object is made at the center of the screen, and hence the iconized second object in FIG. 3B is displayed at the center of the screen. The pointed protruding portion of the iconized second object indicates a position at which the second object is to be inserted in the first object.

When the user input for selecting the second object falls at the center of the screen, the first object may be displayed with the center of the parent image centered on the screen. The first object may be displayed in the size of the parent image as it is, enlarged or reduced in accordance with the screen, or may be enlarged or reduced according to the ratio set by the user.

Figure 4A:
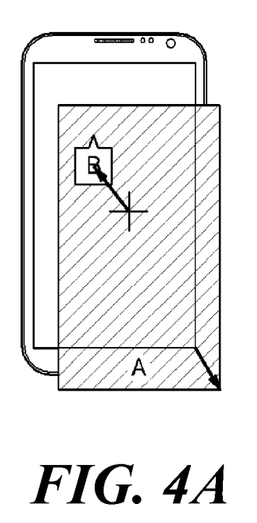
FIGS. 4A to 4C show a method according to at least one embodiment, illustrating a screen change according to a drag of a second object.
Figure 4B:
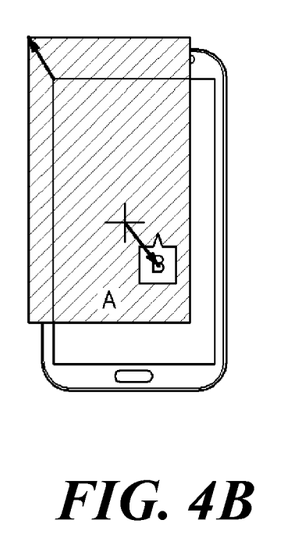
Figure 4C:
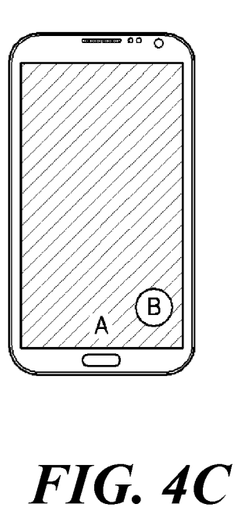

FIGS. 4A to 4C show a method according to at least one embodiment, illustrating a screen change according to a drag of a second object.

FIG. 4A shows a screen change after the electronic device receives a user input to drag the second object in the upper left direction. As shown in FIG. 4A, when the electronic device receives the user input for dragging the second object in the upper left direction, the first object moves in the lower right direction.

FIG. 4B shows a screen change after the electronic device receives a user input to drag the second object in the lower right direction. As shown in FIG. 4B, when the electronic device receives input from the user for dragging the second object in the lower right direction, the first object moves in the upper left direction.

As shown in FIGS. 4A and 4B, when the electronic device receives a user input to drag a second object, the first object moves in a direction opposite to the drag direction. The moving distance of the first object is determined by the drag distance of the second object. Specifically, the moving distance of the first object may be k times (k is a positive real number) the drag distance of the second object. The value of k may be determined by the size of the parent image, whether the parent image is enlarged, the area, in the parent image, displayed on the current screen, and the like. FIGS. 4A to 4C show the illustrative case where the drag distance of the second object and the movement distance of the first object are equal.

On the other hand, as shown in FIGS. 4A and 4B, the outer area of the first object may be displayed on the screen depending on the movement of the first object. The outer area beyond the end of the first object may be displayed as a gray background, a black background, or the like.

According to at least one embodiment of the present disclosure, the first object moves in a direction opposite to the drag direction of the second object and the outer area beyond the end of the first object is displayed on the screen. Therefore, the user can easily insert the second object in the parent image at a corner position.

FIG. 4C shows the screen change when the electronic device receives a user input to end the drag. As shown in FIG. 4C, when the drag is completed, the second object is placed at the position where the dragging is completed on the first object. The operation of placing the second object may include inserting the second object at the position where dragging has completed on the first object.

When the object insertion is completed, the electronic device may refresh the screen. The refresh may be to display the first object in the same state as the first object was displayed before the dragging of the second object, and to display the second object inserted in the first object as a specific icon on the first object. The icon indicating the position where the second object is inserted in the first object may be a ⊙ shaped icon.

Figures 5A, 5B:
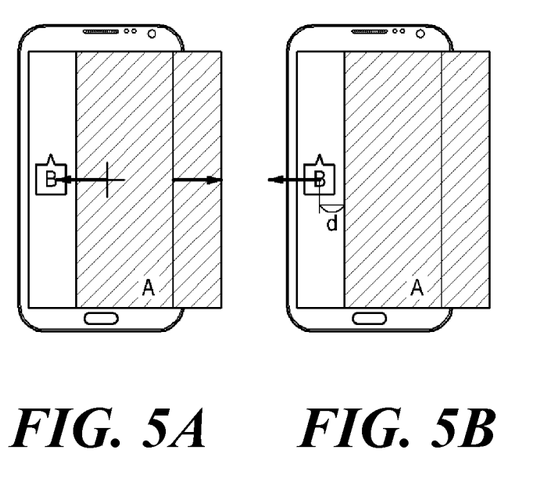
FIGS. 5A to 5C show a method of performing an additional function with a second object dragged to an outer area, according to at least one embodiment.
Figure 5C:
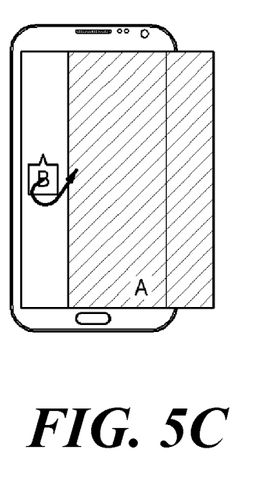

FIGS. 5A to 5C show a method of performing an additional function with a second object dragged to an outer area, according to at least one embodiment.

When the electronic device receives a user input to drag the second object, the first object moves in a direction opposite to the drag direction of the second object. The first object may move in a direction opposite to the drag direction of the second object, and thereby an outer area beyond the end of the first object may be displayed on the screen.

FIG. 5A shows a state in which the second object is dragged to an outer area beyond the end of the first object. As shown in FIG. 5A, it is allowed to drag the second object to an outer area beyond the end of the first object. The dragging to the outer area is not a drag for positioning the second object at the position to insert it in the first object, but a drag for performing an additional function. Once the second object is dragged to the outer area, the additional function may be performed in the following manner.

FIG. 5B shows a state of receiving a user input for leftwardly dragging the second object that is in the outer area. As shown in FIG. 5B, when the second object in the outer area is dragged to the left direction, a predetermined function may be arranged to be performed. Alternatively, one or more functions may be made to be selectively performed, according to the distance from the end of the first object to the second object dragged to the outer area in the left direction.

As opposed to FIG. 5B, let's suppose that the second object is continuously dragged to the right, so that the first object continues to move to the left, resulting in an outer area being displayed on the right side of the screen and the second object being moved to the outer area. In this state, when the second object in the outer area is dragged to the right direction, the predetermined function may be arranged to be performed. Alternatively, one or more functions may be made to be selectively performed, according to the distance between the end of the first object and the second object dragged to the outer area in the right direction.

On the other hand, assume that the second object is continuously dragged upward and the first object continues to move downward, resulting in an outer area being displayed above the screen and the second object being moved to that outer area. In this state, when the second object in the outer area is dragged in the upward direction, the predetermined function may be arranged to be performed. Alternatively, one or more functions may be made to be selectively performed, according to the distance from the end of the first object to the second object dragged to outer area in the upward direction.

On the other hand, assume that the second object is continuously dragged downward so that the first object continues to move upward, resulting in an outer area being displayed at the bottom of the screen and the second object being moved to the outer area. In this state, when the second object in the outer area is dragged downward, the predetermined function may be made to be performed. Alternatively, one or more functions may be made to be selectively performed, depending on the distance between the end of the first object and the distance of the second object dragged downward.

FIG. 5C shows a state of receiving a user input for dragging the second object that is in the outer area and thereby inputting a gesture. As shown in FIG. 4C, when a gesture is input by dragging a second object in the outer area, a predetermined function may be made to be performed according to the type of gesture.

A predetermined function may be made to be performed by receiving various user inputs other than the gesture input, while the second object resides in the outer area. For example, in some arrangement, when the user gives a voice command in a state where the second object is in the outer area, the voice command of the user may be analyzed, to accordingly perform the predetermined function.

An additional function may be performed while the second object is in the outer area and when the electronic device receives a user input for dragging the second object leftward, rightward, upward or downward, or receives a user event by user gesture, voice, etc. The additional function may be the following.

The additional function may be a feature for changing the parent image. When it is desired to change the parent image, it is troublesome to go back to the initial screen, select the parent image, and again select the second object. Therefore, it is necessary to change the parent image while maintaining the selection of the second object, and such a function may be performed through a drag or a user event in the outer area.

The additional function may be a page detailing function. Page detailing is the ability to insert additional information about the parent image at the same level as the parent image on the tree structure. Additional information inserted at the same level as the parent image may be an image, a video, text, voice, link to another file, Internet address link URL, and the like.

The additional function may be a stacking function. Stacking refers to the ability to stick or stack objects to be inserted on one side of the screen. When using the stacking function to stack the iconized small object on a specific area of the screen, for example, the right or left corner of the screen, the stacked object is always displayed in a specific area of the screen independent of the parent image. Stacking enables to easily insert one or more objects into the parent image.

In addition, various functions such as delete the pointer, cancel the pointer, return to the previous step, view the navigation map for showing the tree structure of the multi-depth image, cancel the insertion process, change the object to be inserted, delete all objects inserted in the parent image, etc.

Figure 6A:
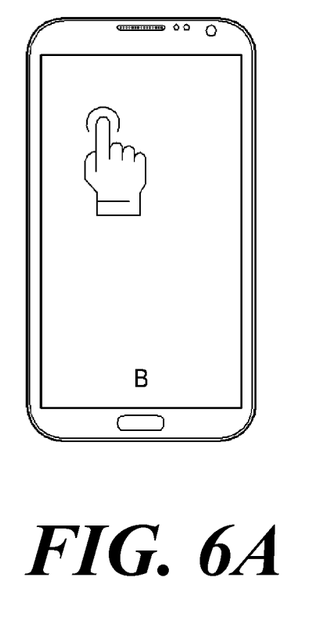
FIGS. 6A and 6B show a method according to at least one embodiment, illustrating a screen change after selection of a second object, where a user input for selection of the second object is not centrally positioned on the screen.
Figure 6B:
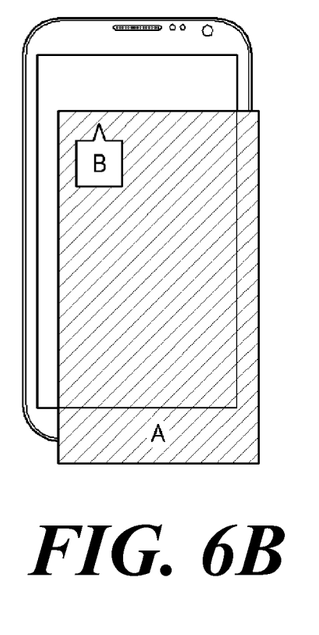

FIGS. 6A and 6B show a method according to at least one embodiment, illustrating a screen change after selection of a second object, when a user input for selection of the second object is not centrally positioned on the screen.

FIG. 6A shows a screen in which an electronic device receives input from a user to select a second object to be inserted into a parent image. While FIG. 3A shows the center of the screen as the position of the user input for selecting the second object, FIG. 6A shows the upper left of the screen as the position of the user input for selecting the second object.

FIG. 6B shows a screen change after an electronic device receives a user input to select a second object to be inserted into a parent image.

When the second object is selected, the first object and the iconized second object are displayed on the screen.

The position where the iconized second object is displayed may be the position of the user input for selecting the second object. In FIG. 6A, since the user input for selecting the second object is on the upper left of the screen, the iconized second object in FIG. 6B is displayed on the upper left of the screen.

When the user input for selecting the second object is made to the upper left of the screen, the first object may be displayed at a position shifted from the center of the screen to a direction opposite to the direction toward the upper left of the screen. The present embodiment predicts that the user is to insert the second object on the upper left of the parent image, and moves and displays the first object in the opposite direction in advance. At this time, the moving direction and distance of the first object may be determined in the same manner as described above with reference to FIG. 4.

Figure 7A:
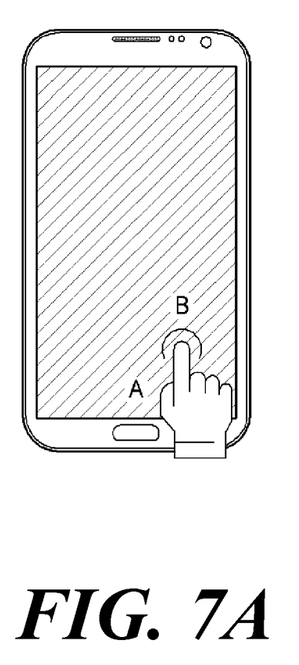
FIGS. 7A and 7B show a method according to at least one embodiment, illustrating a screen change after selection of a second object which has been already inserted in the parent image.
Figure 7B:
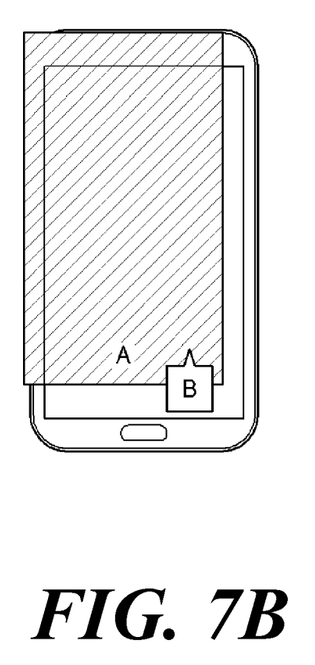

FIGS. 7A and 7B show a method according to at least one embodiment, illustrating a screen change after selection of a second object which has been already inserted in the parent image.

FIG. 7A shows as in FIG. 4C, that the second object already inserted in the parent image is selected by the finger. FIG. 7B shows that the screen changes when selecting the second object already inserted in the parent image.

When the second object is selected, the first object and the iconized second object are displayed on the screen.

The position where the iconized second object is displayed may be the position of the user input for selecting the second object.

The second object has been inserted at a specific position in the parent image, and therefore the iconized second object needs to be displayed at the same inserted position in the first object. To this end, the second object is displayed at the position of the user input for selecting the second object, and the first object is displayed with a movement made based on the location where the second object is positioned. For example, the first object is displayed with a movement made in a direction opposite to the direction in which the second object is separated from the center of the screen. In FIG. 7A, the position where second object B is inserted is separated toward the right-bottom from the center of the screen, and therefore first object A is displayed on the screen after being moved in the upper left direction.

5. Second Embodiment

FIGS. 8A, 8B, 9A, 9B, 10A and 10B illustrate a method applicable to a case where the second object is to be inserted in an oversized parent image for the screen or in an enlarged parent image beyond the screen size. FIGS. 8A, 8B, 9A, 9B, 10A and 10B are particularly useful when the parent image is a 360-degree image, VR image, panoramic image, or the like.

Figure 8A:
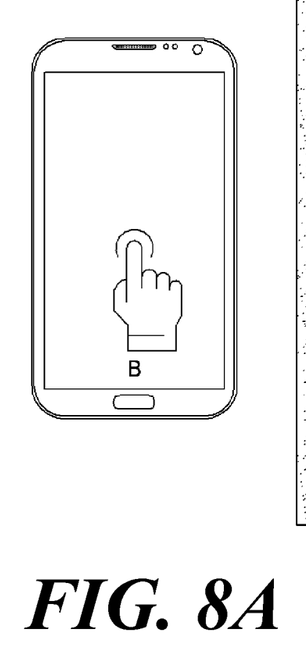
FIGS. 8A and 8B show a method according to at least one embodiment, illustrating a screen change after selection of a second object which is desired to be inserted before reducing an oversized parent image for the screen or after enlarging a fit parent image for the screen beyond the screen size.
Figure 8B:
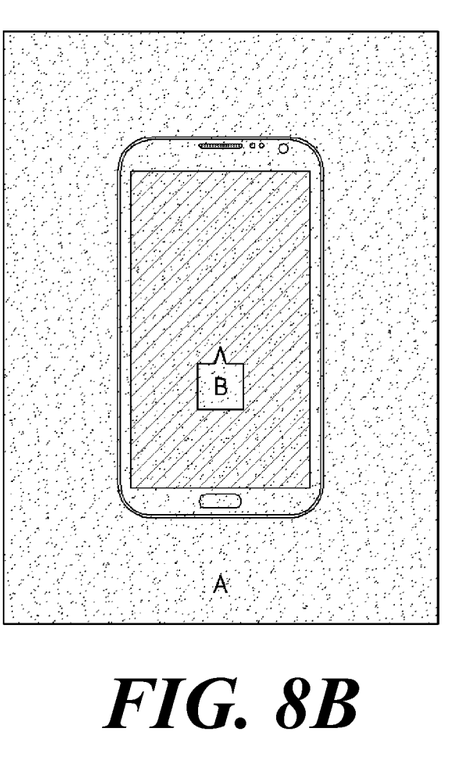

FIGS. 8A and 8B show a method according to at least one embodiment, illustrating a screen change after selection of a second object which is to be inserted in the oversized parent image for the screen or in the enlarged parent image beyond the screen size.

FIG. 8A shows a screen of an electronic device receiving a user input to select a second object to be inserted into a parent image. FIG. 8A simulates selecting the second object to be inserted in the oversized parent image for the screen or in the enlarged parent image parent image beyond the screen size.

FIG. 8B shows a screen change after the electronic device receives the user input to select the second object to be inserted into the parent image.

When the second object is selected, the first object and the iconized second object are displayed on the screen.

The position where the iconized second object is displayed may be the position of the user input for selecting the second object. In FIG. 8A, the user input for selecting the second object is made at the center of the screen, and therefore the iconized second object in FIG. 8B is displayed at the center of the screen.

When the user input for selecting the second object is made at the center of the screen, the first object may be displayed by placing the center of the parent image in the center of the screen. The first object takes up the full screen since the parent image is oversized for the screen or is enlarged beyond the screen size.

Some area of the parent image may be displayed in its original color, while the other area may be displayed darker than the original color. The original-colored area on display out of the parent image is referred to as 'window'. The size of the window may be set equal to the size of the screen. However, the present disclosure is not limited to this, and the window size may be larger or smaller than the screen.

The area inside the window out of the parent image is used to visually emphasize the current editable area in the parent image, that is, the area to which the second object is to be inserted. The area outside the window indicates that such area has not yet entered into the editing target.

The window may be displayed in various ways, since the window is intended to visually emphasize the editable area. For example, the window may be displayed with a rectangular outline instead of shading of the parent image.

Figure 9A:
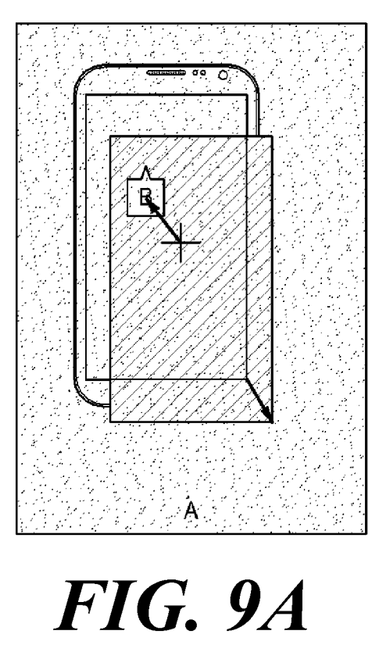
FIGS. 9A and 9B show a method according to at least one embodiment, illustrating the movement of a first object, parent image and window after a drag of a second object which is desired to be inserted before reducing an oversized parent image for the screen or after enlarging a fit parent image for the screen beyond the screen size.
Figure 9B:
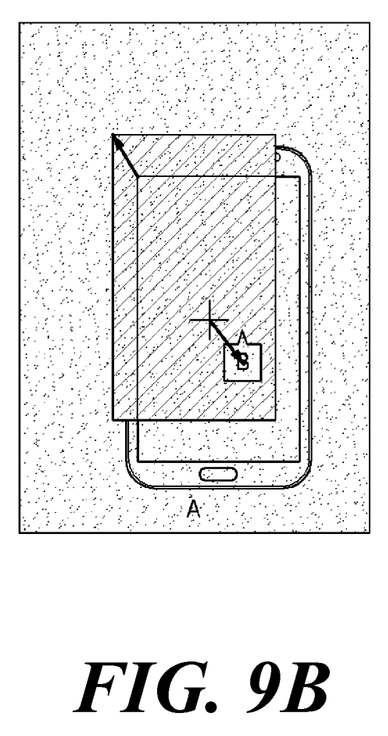

FIGS. 9A and 9B show a method according to at least one embodiment, illustrating the movement of a first object, parent image and window after a drag of a second object which is desired to be inserted in the oversized parent image for the screen or in the enlarged parent image beyond the screen size.

FIG. 9A shows a screen change after the electronic device receives a user input to drag the second object in the upper left direction. As shown in FIG. 9(*a*), when the electronic device receives the user input for dragging the second object in the upper left direction, the first object moves in the lower right direction. The parent image and window also move in the same direction and distance as the first object. The moving direction and distance of the first object, parent image and window may be determined in the same manner as described above with reference to FIG. 4.

FIG. 9B shows a screen change after the electronic device receives a user input to drag the second object in the lower right direction. As shown in FIG. 9(*b*), when the electronic device receives the user input for dragging the second object in the lower right direction, the first object moves in the upper left direction. At this time, the parent image and window also move in the same direction and distance as the first object. The moving direction and distance of the first object, parent image and window may be determined in the same manner as described above with reference to FIGS. 4A to 4C.

On the other hand, as shown in FIGS. 9A and 9B, the other area of the parent image may be displayed on the screen according to the movement of the first object. The part outside the window may be made to appear darker than the original color.

When the drag is completed, the second object is placed at the position where the dragging is terminated on the first object. The operation of placing may include inserting the second object at a position where the dragging has terminated on the first object.

When the object insertion is completed, the electronic device may refresh the screen. The refresh may be to display the first object in the same state as the first object was displayed before the dragging of the second object, and to display the second object inserted in the first object as a specific icon on the first object. The icon indicating the position where the second object is inserted in the first object may be a ⊙ shaped icon.

Figure 10A:
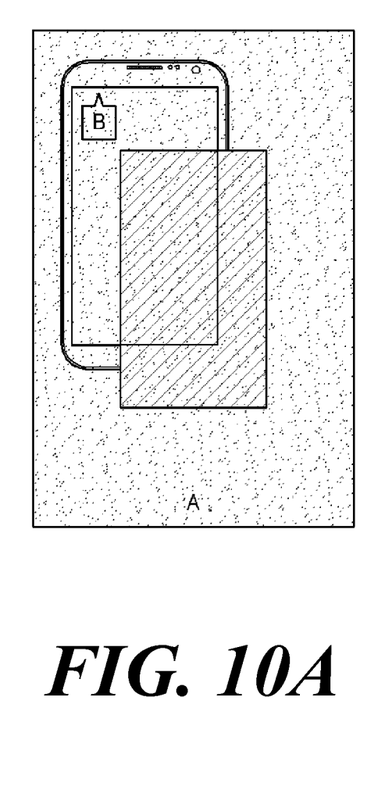
FIGS. 10A and 10B show a method according to at least one embodiment, illustrating the movement of a first object, parent image and window in response to a drag of a second object out of the window, when the second object is desired to be inserted before reducing an oversized parent image for the screen or after enlarging a fit parent image for the screen beyond the screen size.
Figure 10B:
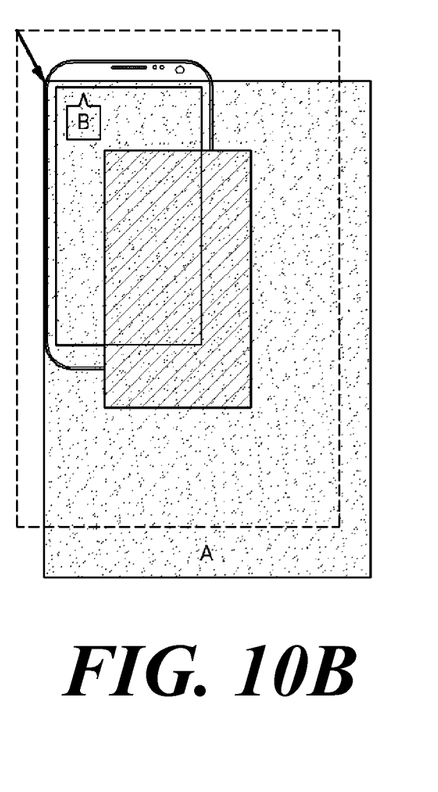

FIGS. 10A and 10B show a method according to at least one embodiment, illustrating the movement of a first object, parent image and window in response to a drag of a second object out of the window, when the second object is desired to be inserted in the oversized parent image for the screen or in the enlarged parent image beyond the screen size.

Upon receiving the user input for dragging the second object by the electronic device, the first object, parent image, and window move in a direction opposite to the drag direction of the second object. According to the movement of the first object, the other area of the parent image may be displayed on the screen. The part outside the window may be made to appear darker than the original color.

FIG. 10A shows the second object having been dragged out of the window. As shown in FIG. 10A, it is allowed to drag the second object out of the window.

FIG. 10B shows a state in which dragging is stopped once the second object is dragged out of the window, and a user input is being received to hold a click or a touch. As shown in FIG. 10B, when the drag of the second object is stopped out of the window with the click or touch for the second object held, the parent image and first object are continuously moved while immobilizing the window. At this time, the moving speed of the parent image and first object is referred to as a first speed.

Immobilizing the window and moving the parent image and first object at the first rate can maintain focused attention to the user's editable area, and help the user to easily locate the position to insert the second object in the other area of the parent image.

Meanwhile, the moving speed of the parent image and first object may be changed according to the position where the second object is dragged out of the window. For example, when the second object and the window are spaced apart by a predetermined distance or more, or when the second object is too close to the screen edge by less than a predetermined distance, the parent image and first object may be made to move at a second speed different from the first speed.

In addition, the parent image and first object may be made to change their travel course, in response to additional dragging of the second object further to its initial drag out of the window. For example, when the second object is dragged out of the window and then undergoes a second drag, the parent image and first object may be made to move in a direction opposite to the direction of the second drag.

Dragging the second object back from the outside of the window to the inside thereof may stop the movement of the parent image and the first object at the first speed, so that the second object may be inserted into the area displayed inside the current window.

6. Flowchart

Figure 11:
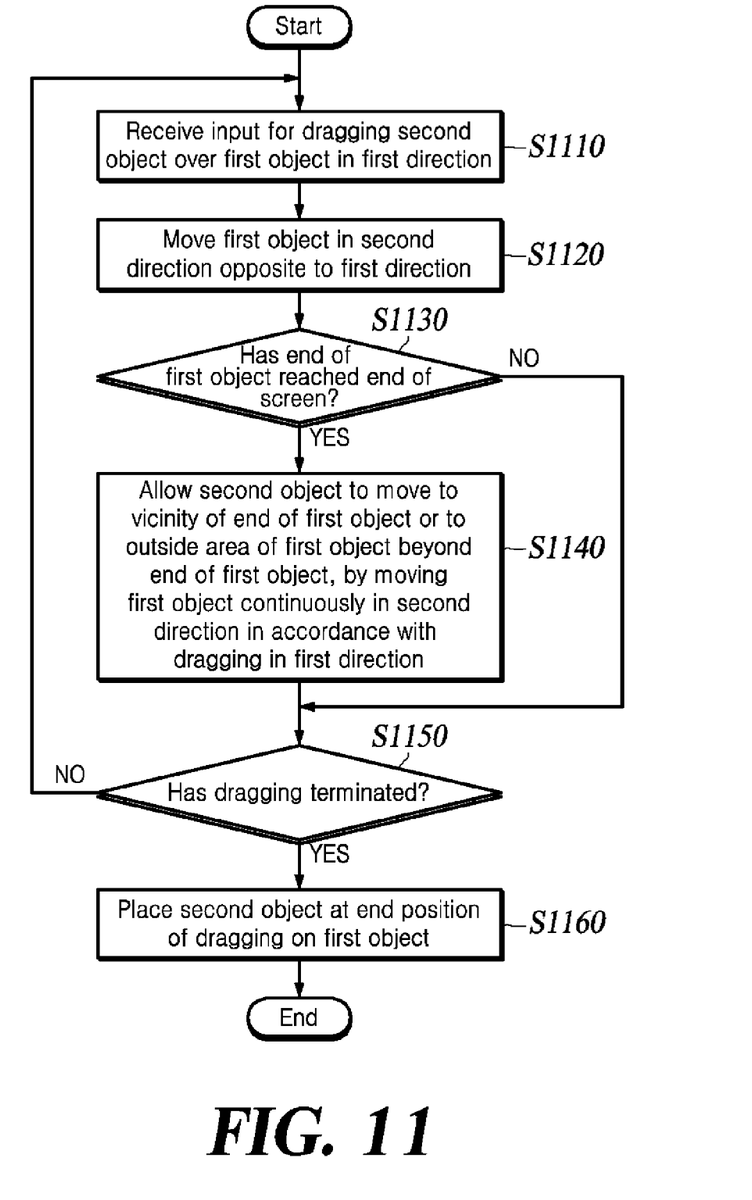
FIG. 11 is a flowchart illustrating an image panning method according to at least one embodiment.

FIG. 11 is a flowchart illustrating an image panning method according to at least one embodiment.

As shown in FIG. 11, an image panning method according to at least one embodiment of the present disclosure is a method performed by an electronic device for placing a second object on a first object displayed on a screen of the electronic device. The image panning method includes receiving an input for dragging the second object to move the same over the first object in a first direction (S1110), moving the first object in a second direction opposite to the first direction (S1120), determining whether the end of the first object reaches the end of the screen (S1130), if YES, allowing the second object to move to the vicinity of the end of the first object or the outside area of the first object beyond the end of the first object, by moving the first object continuously in the second direction in accordance with the dragging in the first direction (S1140), determining whether the dragging is terminated (S1150), and if YES, placing the second object at the end position of the dragging on the first object (S1160).

The remaining descriptions, duplicative of those described in the above embodiments, are omitted to avoid redundancy.

Although Steps S1110 to S1160 in FIG. 11 are described to be sequentially performed, they merely instantiate the technical idea of some embodiments of the present disclosure, and hence Steps S1110 to S1160 are not limited to the illustrated chronological sequences. Therefore, a person having ordinary skill in the pertinent art could appreciate that various modifications, additions, and substitutions are possible by changing the sequences of Steps S1110 to S1160 described in the respective drawings, omitting one or more of Steps S1110 to S1160, or by performing two or more of Steps S1110 to S1160 in parallel, without departing from the gist and the nature of the embodiments of the present disclosure.

The method described in the above embodiments can be implemented as one or more programs which include instruction codes readable by a processor of an electronic device such as a computer or smartphone and are stored in a recording medium readable by the processor. The computer- or smartphone-readable recording medium includes any type of recording device on which data that can be read by a computer system are recordable. Specifically, the computer- or smartphone-readable recording medium includes a magnetic recording medium (e.g., a ROM, a floppy disk, a hard disk, etc.), an optically readable medium (e.g., a CD-ROM, a DVD, etc.), a flash memory (e.g., USB, SSD), and the like. Further, the computer- or smartphone-readable recording medium can be distributed in computer systems connected via a network, wherein computer- or smartphone-readable codes can be stored and executed in a distributed fashion.

Although exemplary embodiments of the present disclosure have been described for illustrative purposes, those skilled in the art will appreciate that various modifications, additions and substitutions are possible, without departing from the idea and scope of the claimed invention.

The exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

The invention claimed is:

1. A method performed by an electronic device for placing a second object on a first object displayed on a screen of the electronic device, the method comprising:

receiving a user input for selecting the second object and designating an initial position on the screen that the first object is being displayed;

iconizing the second object, and displaying the iconized second object at the initial position on the screen while displaying on the screen the first object in a state that the first object is shifted in a direction opposite to a direction toward the initial position from a center of the screen;

in response to starting a drag for moving the second object over the first object in a first direction, moving the first object displayed on the screen in a second direction opposite to the first direction while the drag is in progress, wherein a distance of the movement of the first object is proportional to a distance of the drag; and placing the second object at an end position of the drag in the first object, when the drag is terminated for the second object, wherein the moving of the first object in the second direction comprises:

moving, even when an end of the first object reaches an end of the screen, the first object continuously in the second direction in accordance with the drag of the second object in the first direction, to thereby allow a drag for moving the second object to a vicinity of the end of the first object or to an outside area of the first object beyond the end of the first object.

2. The method of claim 1, wherein the first object is all or some area of an image.

3. The method of claim 1, wherein the placing of the second object comprises:

inserting the second object at the end position of the drag in the first object.

4. The method of claim 1, further comprising:

performing at least one predetermined operation in response to the drag for moving the second object to the outside area of the first object beyond the end of the first object.

5. The method of claim 4, wherein different predetermined operations are performed based on at least one of a direction of the drag of the second object from the end of the first object to the outside area, or a distance of the drag of the second object from the end of the first object to the outside area.

6. The method of claim 4, further comprising:

performing an operation corresponding to an event input by a user in the state that the second object has been dragged to the outside area beyond the end of the first object.

7. The method of claim 1, further comprising:

receiving a user input for selecting the second object already placed on the first object; and displaying on the screen the first object that is shifted in a direction opposite to a direction toward a position where the second object is placed from a center of the screen.

8. The method of claim 1, further comprising, prior to the moving of the first object in the second direction:

overlapping a window for emphasizing all or a portion of the first object on the first object and displaying on the screen the window overlapped with the first object, and wherein the moving of the first object in the second direction opposite to the first direction, comprises:

moving the first object and the window simultaneously in the second direction in accordance with the drag for moving the second object in the first direction.

9. The method of claim 8, wherein the first object has an inside area displayed inside the window and an outside area displayed outside the window, the inside area and the outside area being displayed on the screen with different visual effects from each other.

10. The method of claim 8, further comprising:

responsive to when the drag for moving the second object in the first direction is terminated outside the window, stopping movement of the window and moving the first object at a first speed in the second direction.

11. The method of claim 10, further comprising:

depending on a position where the drag for moving the second object in the first direction is terminated outside the window, moving the first object in the second direction at a second speed different from the first speed.

12. The method of claim 10, further comprising:

responsive to when the second object is dragged from the outside of the window back into the window, stopping the moving of the first object at the first speed in the second direction.

13. A non-transitory computer-readable recording medium storing a computer program including computer-executable instructions for causing, when executed in a processor, the processor to perform the method of claim 1.

* * * * *